United States Patent
Cipolla et al.

(10) Patent No.: US 12,064,308 B2
(45) Date of Patent: Aug. 20, 2024

(54) DENTAL TREATMENT TRAY

(71) Applicant: Nottingham Spirk Design Associates, Cleveland, OH (US)

(72) Inventors: Mark E. Cipolla, Cleveland, OH (US); Trevor L. Jackson, Cleveland, OH (US); Jesse P. Carlson, Cleveland, OH (US)

(73) Assignee: Nottingham Spirk Design Associates

(*) Notice: Subject to any disclaimer, the term of this patent is extended or adjusted under 35 U.S.C. 154(b) by 0 days.

(21) Appl. No.: 17/691,210

(22) Filed: Mar. 10, 2022

(65) Prior Publication Data
US 2022/0287812 A1 Sep. 15, 2022

Related U.S. Application Data

(60) Provisional application No. 63/159,270, filed on Mar. 10, 2021.

(51) Int. Cl.
*A61C 19/06* (2006.01)
(52) U.S. Cl.
CPC .................. *A61C 19/066* (2013.01)
(58) Field of Classification Search
CPC ... A61C 19/06; A61C 19/0063; A61C 19/066; A61C 17/228; A61C 17/08; A61C 15/00;
(Continued)

(56) References Cited

U.S. PATENT DOCUMENTS 4,495,945 A * 1/1985 Liegner ............. A61M 16/0493
128/200.26
5,620,011 A * 4/1997 Flowers ................ B63C 11/186
128/859

(Continued)

FOREIGN PATENT DOCUMENTS

| KR | 101522313 B1 | | 5/2015 |
| WO | 2018/096524 A1 | | 5/2018 |
| WO | 2018096524 | * | 5/2018 |

OTHER PUBLICATIONS

International Search Report and Written Opinion mailed Jun. 21, 2022 in corresponding International Application No. PCT/US2022/019710.

*Primary Examiner* — Edward Moran
*Assistant Examiner* — Matthew P Saunders
(74) *Attorney, Agent, or Firm* — Renner, Otto, Boisselle & Sklar, LLP (57) ABSTRACT

A dental treatment tray for applying a dental treatment to teeth and/or gums of a user includes a top tray including a base surface having at least one hole extending through the base surface, and a bottom tray including a base surface having at least one hole extending through the base surface. The dental treatment tray includes at least one chamber formed between the base surface of the top tray and the base surface of the bottom tray, and at least one dental treatment capsule contained within the chamber. The capsule encapsulates the dental treatment and is configured to release the dental treatment when in the mouth of the user. The at least one hole of the top tray and the at least one hole of the bottom tray are configured to permit passage of the dental treatment from the chamber to the teeth and/or gums of the user.

19 Claims, 5 Drawing Sheets

(58) Field of Classification Search
CPC ... A61C 5/62; A61C 5/66; A61C 19/00–0013; A61C 17/227; A61M 2210/0625–0656; A61M 31/002; A61Q 11/00; A61Q 11/02; A46B 11/0003; A46B 2200/1026; A61F 5/566; A61F 2005/563; A63B 71/085; A63B 207/056; A63B 207/088

See application file for complete search history.

(56) References Cited

U.S. PATENT DOCUMENTS

| | | | | |
|---|---|---|---|---|
| 2004/0234456 | A1* | 11/2004 | Slaughter | A61C 19/063 |
| | | | | 128/200.23 |
| 2008/0280251 | A1 | 11/2008 | Gallagher | |
| 2013/0087157 | A1* | 4/2013 | Hawkins | A63B 71/085 |
| | | | | 264/16 |
| 2014/0238417 | A1* | 8/2014 | Turkbas | A61C 19/063 |
| | | | | 128/861 |
| 2018/0263746 | A1* | 9/2018 | Demarest | A61C 19/066 |

* cited by examiner

| |
|---|
| PLACING AT LEAST ONE CAPSULE IN AT LEAST ONE DEPRESSION IN A BASE SURFACE OF THE BOTTOM TRAY, THE BASE SURFACE OF THE BOTTOM TRAY DEFINED BY TWO PERIPHERAL EDGES AND TWO END EDGES — 102 |
| CONNECTING TWO PERIPHERAL EDGES AND TWO END EDGES DEFINING A BASE SURFACE OF A TOP TRAY OF THE DENTAL TREATMENT TRAY RESPECTIVELY TO THE TWO PERIPHERAL EDGES AND TWO END EDGES OF THE BASE SURFACE OF THE BOTTOM TRAY — 104 |

FIG. 8

DENTAL TREATMENT TRAY

This application claims the benefit of U.S. Application No. 63/159,270, filed Mar. 10, 2021, the entire disclosure of which is hereby incorporated by reference.

TECHNICAL FIELD

The present disclosure relates generally to dental treatments, and more particularly to dental treatment trays.

BACKGROUND

Dental treatment trays are used to apply a dental treatment (e.g., whitening gel, remineralization gel, etc.) to the teeth and gums of a user. Typical dental treatment trays include at least one of a top tray and a bottom tray configured to hold a treatment in the form of a liquid, gel, or solid dental treatment inserted therein. A user can then place the dental treatment tray in their mouth such that their teeth and gum line, directly contact the liquid, gel, or solid dental treatment held within the dental treatment tray. Such dental treatment trays can be inconvenient and cumbersome to operate, requiring the user to first place the dental treatment within the tray, and then arrange the tray appropriately in the user's mouth without spilling any of the dental treatment. Such handling of the dental treatment can cause an undesirable and unnecessary mess during and after use by the user.

SUMMARY

An improved dental treatment tray configured to apply a dental treatment to teeth and gums of a user is described herein. The dental treatment tray is configured to contain at least one capsule encapsulating a dental treatment therein, the at least one capsule being contained respectively in at least one chamber between a top tray and a bottom tray. The top tray and the bottom tray each include at least one hole through which the dental treatment may pass from the at least one chamber to the teeth and/or gums of the user when, for example, the user applies a biting force on the dental treatment tray and breaks an outer shell of the at least one capsule. Although the at least one hole of the top tray and the bottom tray allow passage of the dental treatment out of the at least one chamber, the at least one chamber is configured to retain the shell of the at least one capsule. Otherwise, the at least one capsule shell may just dissolve and release the dental treatment when in the mouth of the user. Accordingly, much of the hassle and mess of conventional dental treatment trays can be avoided, as the user does not have to worry about placing the dental treatment within the dental treatment tray or worry about the dental treatment spilling from the dental treatment tray during use. The dental treatment tray described herein may be a single use and disposable dental treatment tray.

According to an aspect of this disclosure, a dental treatment tray for applying a dental treatment to teeth and gums of a user includes a top tray including a base surface having at least one hole extending through the base surface of the top tray. The dental treatment tray includes a bottom tray including a base surface having at least one hole extending through the base surface of the bottom tray. The dental treatment tray also includes at least one chamber formed between the base surface of the top tray and the base surface of the bottom tray, and at least one dental treatment capsule contained within the at least one chamber. The at least one dental treatment capsule encapsulates the dental treatment and is configured to release the dental treatment when in the mouth of the user. The at least one hole of the top tray and the at least one hole of the bottom tray are configured to permit passage of the dental treatment from the chamber to the teeth and gums of the user.

According to an embodiment of any paragraph(s) of this summary, the at least one dental treatment capsule includes a shell.

According to another embodiment of any paragraph(s) of this summary, the shell of the at least one dental treatment capsule is configured to break when a biting force is applied to the base surface of the top tray and the base surface of the bottom tray by the teeth and gums of the user, thereby releasing the dental treatment.

According to another embodiment of any paragraph(s) of this summary, the at least one hole of the top tray and the at least one hole of the bottom tray are configured to prevent passage of the shell of the at least one dental treatment capsule from the chamber.

According to another embodiment of any paragraph(s) of this summary, the shell of the at least one dental treatment capsule is configured to dissolve when the dental treatment tray is in the mouth of the user, thereby releasing the dental treatment.

According to another embodiment of any paragraph(s) of this summary, the top tray further includes two sidewalls each extending from the base surface of the top tray along at least a portion of a respective peripheral edge of the base surface of the top tray.

According to another embodiment of any paragraph(s) of this summary, the bottom tray further includes two sidewalls each extending from the base surface of the bottom tray along at least a portion of a respective peripheral edge of the base surface of the bottom tray.

According to another embodiment of any paragraph(s) of this summary, at least one of the at least one hole of the top tray and the at least one hole of the bottom tray are elongated in shape.

According to another embodiment of any paragraph(s) of this summary, at least one of the at least one hole of the top tray and the at least one hole of the bottom tray are circular in shape.

According to another embodiment of any paragraph(s) of this summary, the at least one hole of the top tray includes more than one hole and the at least one hole of the bottom tray includes more than one hole.

According to another embodiment of any paragraph(s) of this summary, each of the more than one hole of the top tray and each of the more than one hole of the bottom tray, respectively, have the same size.

According to another embodiment of any paragraph(s) of this summary, at least two of the more than one hole of the top tray and at least two of the more than one hole of the bottom tray, respectively, have different sizes.

According to another embodiment of any paragraph(s) of this summary, the at least one capsule is elongated.

According to another embodiment of any paragraph(s) of this summary, the at least one capsule is spherical.

According to another embodiment of any paragraph(s) of this summary, the at least one capsule includes more than one capsule.

According to another embodiment of any paragraph(s) of this summary, each of the more than one capsule is the same size.

According to another embodiment of any paragraph(s) of this summary, at least two of the more than one capsule have different sizes.

According to another embodiment of any paragraph(s) of this summary, the top tray includes at least one top pull tab extending from the top tray.

According to another embodiment of any paragraph(s) of this summary, the bottom tray includes at least one bottom pull tab extending from the bottom tray.

According to another aspect of this disclosure, a method of assembling a dental treatment tray for applying a dental treatment to teeth and gums of a user includes the step of placing at least one capsule in at least one depression in a base surface of a bottom tray of the dental treatment tray. The base surface of the bottom tray is defined by two peripheral edges and two end edges. The method also includes the step of connecting two peripheral edges and two end edges defining a base surface of a top tray of the dental treatment tray respectively to the two peripheral edges and two end edges of the base surface of the bottom tray of the dental treatment tray. The base surface of the top tray includes at least one depression that corresponds to the at least one depression of the base surface of the bottom tray such that at least one chamber is formed between the base surface of the top tray and the base surface of the bottom tray within which the at least one capsule is contained.

The following description and the annexed drawings set forth in detail certain illustrative embodiments described in this disclosure. These embodiments are indicative, however, of but a few of the various ways in which the principles of this disclosure may be employed. Other objects, advantages and novel features will become apparent from the following detailed description when considered in conjunction with the drawings.

BRIEF DESCRIPTION OF DRAWINGS

The annexed drawings show various aspects of the disclosure.

DETAILED DESCRIPTION

The dental treatment tray described herein may be used to treat and prevent common dental issues. Specifically, the dental treatment tray is pre-filled with a powerful and effective recommended dosage of a particular dental treatment for the user and is configured to ensure complete coverage and application of the dental treatment to the user's teeth and/or gums. The dental treatment may be, for example, sodium fluoride, a whitening treatment, or any other desired treatment for the user's teeth and/or gums. The dental treatment may be in the form of a liquid, a gel or a solid and may be provided inside a capsule having a shell to contain the dental treatment. The dental treatment tray is soft, comfortable and disposable and so that the user can use the dental treatment tray at home or wherever the user desires. Regular usage of the dental treatment tray may help increase overall dental health, prevent cavities and gum disease, and/or reduce the need for costly procedures later in life, depending on the particular dental treatment used therein.

Figure 1:
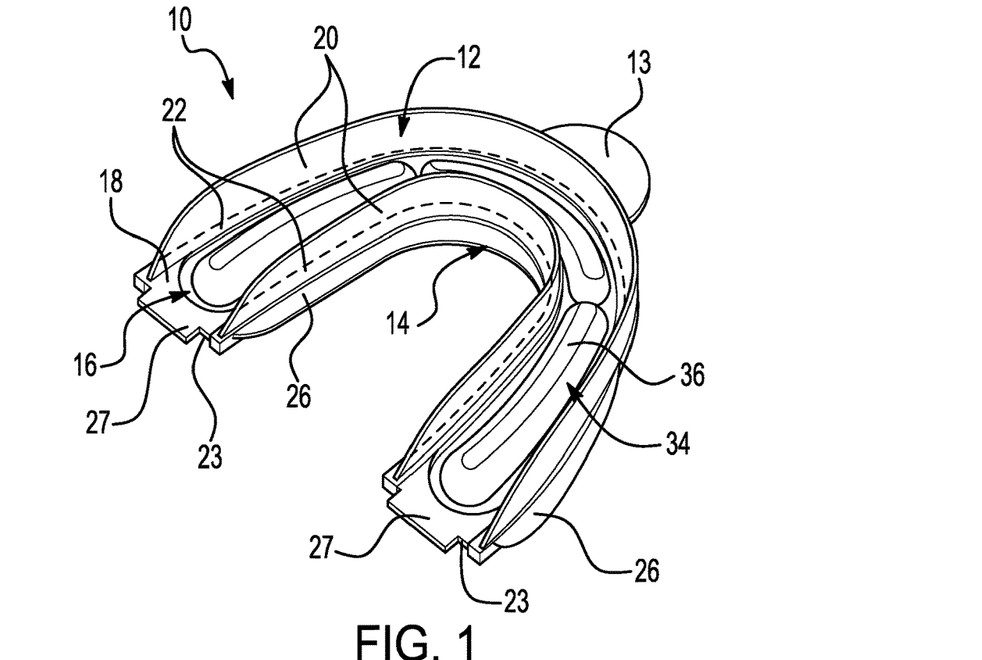
FIG. 1 is a perspective view of a dental treatment tray is a closed configuration.
Figure 2A:
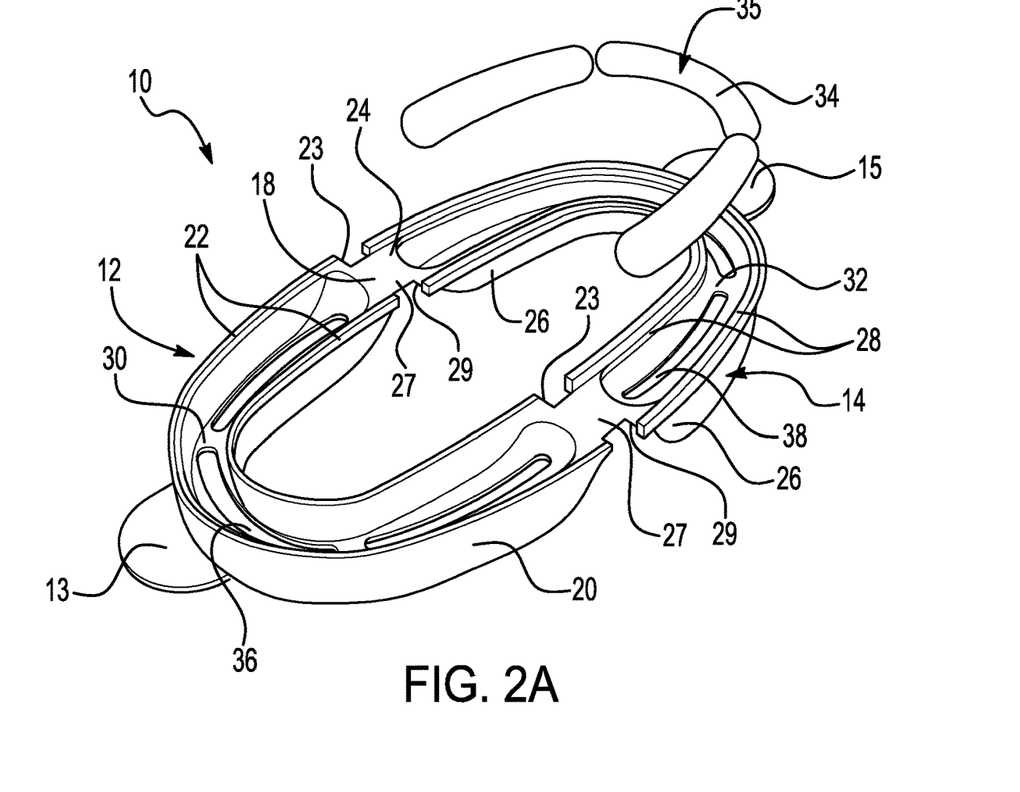
FIG. 2A is a perspective exploded view of the dental treatment tray of FIG. 1 in an open configuration.
Figure 2B:
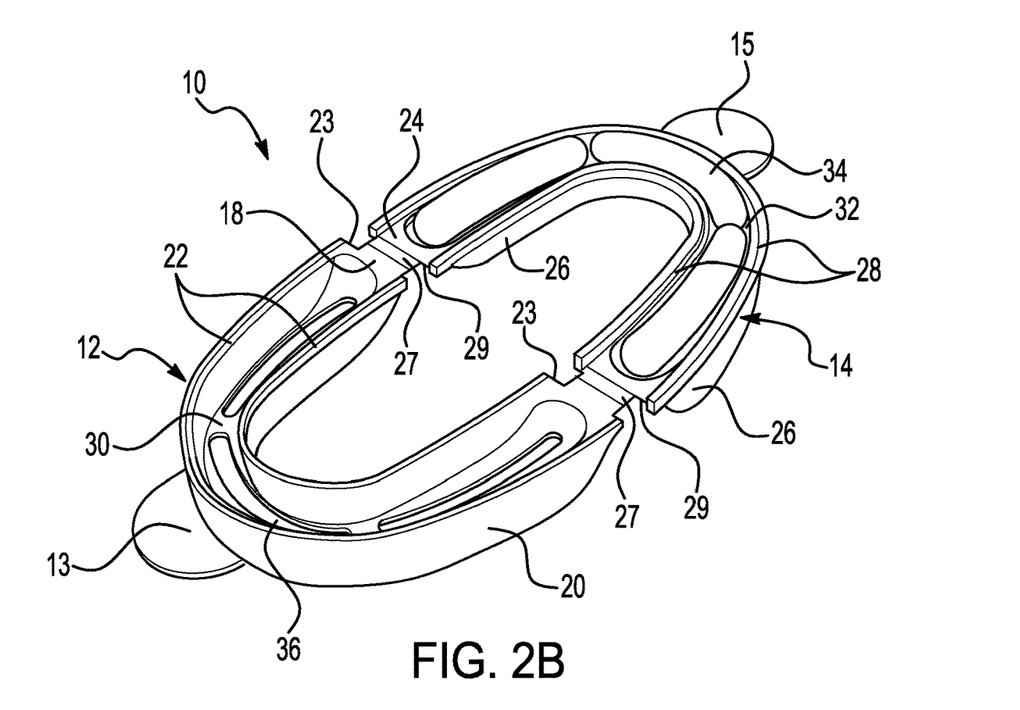
FIG. 2B is a perspective view of the dental treatment tray of FIG. 1 in the open configuration.

With reference to the figures, and initially to FIGS. 1 and 2A-B, a dental treatment tray 10 is depicted. FIG. 1 depicts the dental treatment tray 10 in a closed, ready-to-use configuration, as it is received and used by the user. FIGS. 2A-B depict the dental treatment tray 10 in an open configuration, prior to use by the user, for purposes of viewing the various components thereof. The dental treatment tray 10 includes a top tray 12, a bottom tray 14, and at least one chamber 16 formed between the top tray 12 and the bottom tray 14 when the dental treatment tray 10 is in the closed configuration (FIG. 1). The at least one chamber 16 is configured to contain at least one capsule 34 encapsulating a dental treatment 35 therein.

The top tray 12 includes a base surface 18, defined by two peripheral edges 22 and two end edges 23. The base surface 18 extends in a "U-shape" from a first end edge 23 to a second end edge 23 to conform to the user's top teeth in the user's mouth. The precise shape, arc, width and length of the base surface 18 may vary according to a size and shape of the user's top teeth. For example, the dental treatment tray 10 may have a variety of standardized sizes, such as small, medium and large, for accommodating various sizes and shapes of the mouths and teeth of users. Specifically, the base surface 18 may have a width (from a first peripheral edge 22 a second peripheral edge 22) in the range of 0.76 centimeter (0.3 inch) to 1.52 centimeters (0.6 inch), and a length (from a first end edge 23 to a second end edge 23) in the range of 9.65 centimeters (3.8 inches) to 13.46 centimeters (5.3 inches). A length of the top tray 12 (from the "apex" of the U-shape to end edges 23 of the base surface 18) may therefore be in the range of 4.32 centimeters (1.7 inches) to 5.84 centimeters (2.3 inches). The width of the base surface 18 may be consistent along the length of the base surface 18, or may vary along the length of the base surface 18. The top tray 12 may also include two side walls 20 extending up from the base surface 18 along at least a portion of the length of the base surface 18 at the peripheral edges 22 thereof. The sidewalls 22 are configured to align the top tray 12 around a user's top teeth when placed in the user's mouth. The sidewalls 22 may therefore be configured to extend up from the base surface 18 a height sufficient to cover at least a portion of, if not all, of the user's top teeth up to the user's top gum line. For example, the sidewalls 20 may extend up from the base surface 18 a height in the range of 0.64 centimeter (0.25 inch) to 1.27 centimeters (0.5 inch). The height of each of the sidewalls 20 may be consistent along the length of the base surface 18, or may vary along the length of the base surface 18 to conform to the size and shape of the user's mouth and top gum line. It is understood that the dimensions of the base surface 18 and the sidewalls 20 described herein are provided as non-limiting examples, and that other suitable dimensions of the base surface 18 and the sidewalls 20 may be applicable to the dental treatment tray 10 described herein. The top tray 12 may additionally include at least one top pull tab 13 extending out from the top tray 12 and configured for a user to grasp the at least one top pull tab 13 in order to pick up the dental treatment tray 10 and arrange the dental treatment tray 10 within the user's mouth. The at least one top pull tab 13 may be arranged at any position along the length of the base surface 18 of the top tray 12.

Similarly, as better identified in FIGS. 2A and 2B, the bottom tray 14 includes a base surface 24, defined by two peripheral edges 28 and two end edges 29. The base surface 24 extends in a "U-shape" from a first end edge 29 to a second end edge 29 to conform to the user's bottom teeth in the user's mouth. The precise shape, arc, width and length of the base surface 24 may vary according to a size and shape of the user's bottom teeth or according to the standardized size (e.g., small, medium or large) of the dental treatment tray 10. Specifically, the base surface 24 may have a width (from a first peripheral edge 28 a second peripheral edge 28) in the range of 0.76 centimeter (0.3 inch) to 1.52 centimeters (0.6 inch), and a length (from a first end edge 29 to a second end edge 29) in the range of 9.65 centimeters (3.8 inches) to 13.46 centimeters (5.3 inches). A length of the bottom tray 14 (from the "apex" of the U-shape to end edges 29 of the base surface 24) may therefore be in the range of 4.32 centimeters (1.7 inches) to 5.84 centimeters (2.3 inches). The width of the base surface 24 may be consistent along the length of the base surface 24, or may vary along the length of the base surface 24. The bottom tray 14 may also include two sidewalls 26 extending down from the base surface 24 along at least a portion of the length of the base surface 24 at the peripheral edges 28 thereof. The sidewalls 26 are configured to align the bottom tray 14 around a user's bottom teeth when placed in the user's mouth. The sidewalls 26 may therefore be configured to extend down from the base surface 24 a height sufficient to cover at least a portion of, if not all, of the user's bottom teeth down to the user's bottom gum line. For example, the sidewalls 26 may extend down from the base surface 24 a height in the range of 0.53 centimeter (0.21 inch) to 1.02 centimeters (0.40 inch). The height of each of the sidewalls 26 may be consistent along the length of the base surface 24, or may vary along the length of the base surface 24 to conform to the size and shape of the user's mouth and bottom gum line. It is understood that the dimensions of the base surface 24 and the sidewalls 26 described herein are provided as non-limiting examples, and that other suitable dimensions of the base surface 24 and the sidewalls 26 may be applicable to the dental treatment tray 10 described herein. The bottom tray 14 may additionally include at least one bottom pull tab 15 extending out from the bottom tray 14 and configured for a user to grasp the at least one bottom pull tab 15 in order to pick up the dental treatment tray 10 and arrange the dental treatment tray 10 within the user's mouth. The at least one bottom pull tab 15 may be arranged at any position along the length of the base surface 24 of the bottom tray 14. For example, the at least one bottom pull tab 15 may be aligned with the at least one top pull tab 13 when the dental treatment tray 10 is in the closed configuration (FIG. 1).

In the closed configuration of the dental treatment tray 10 (FIG. 1), the peripheral edges 22 and the end edges 23 of the top tray 12 are respectively connected to the peripheral edges 28 and the end edges 29 of the bottom tray 14. For example, the peripheral edges 22 and the peripheral edges 28 may be connected via a tongue-and-groove connection, or may otherwise be welded, adhered or sealed together. The end edges 23 and the end edges 29 may also be connected via a tongue-and-groove connection, or may otherwise also be welded, adhered or sealed together. In the embodiment depicted in FIGS. 1, 2A and 2B, the end edges 23 are connected to the end edges 29 via a foldable hinge 27. The foldable hinge 27 allows the top tray 12 and the bottom tray 14 of the dental treatment tray 10 to be manufactured as a single piece, connected with the foldable hinge 27 in both an open configuration (FIGS. 2A and 2B) and a closed configuration (FIG. 1) by folding the top tray 12 over the bottom tray 14 and connecting the peripheral edges 22 to the peripheral edges 28. In any embodiment, the respective connections between the peripheral edges 22, 28 and the end edges 23, 29 are configured to effectively seal the chamber 16 along the peripheral edges 22, 28 and the end edges 23, 29 when the dental treatment tray 10 is in the closed configuration (FIG. 1) to contain the at least one capsule 34 therein.

The base surface 18 of the top tray 12 may include at least one well or depression 30 and the base surface 24 of the bottom tray 14 may include at least one corresponding well or depression 32. In the closed configuration (FIG. 1), when the base surface 18 of the top tray 12 opposes the base surface 24 of the bottom tray 14, therefore, the at least one chamber 16 is formed by the depressions 30 and 32.

Figure 3:
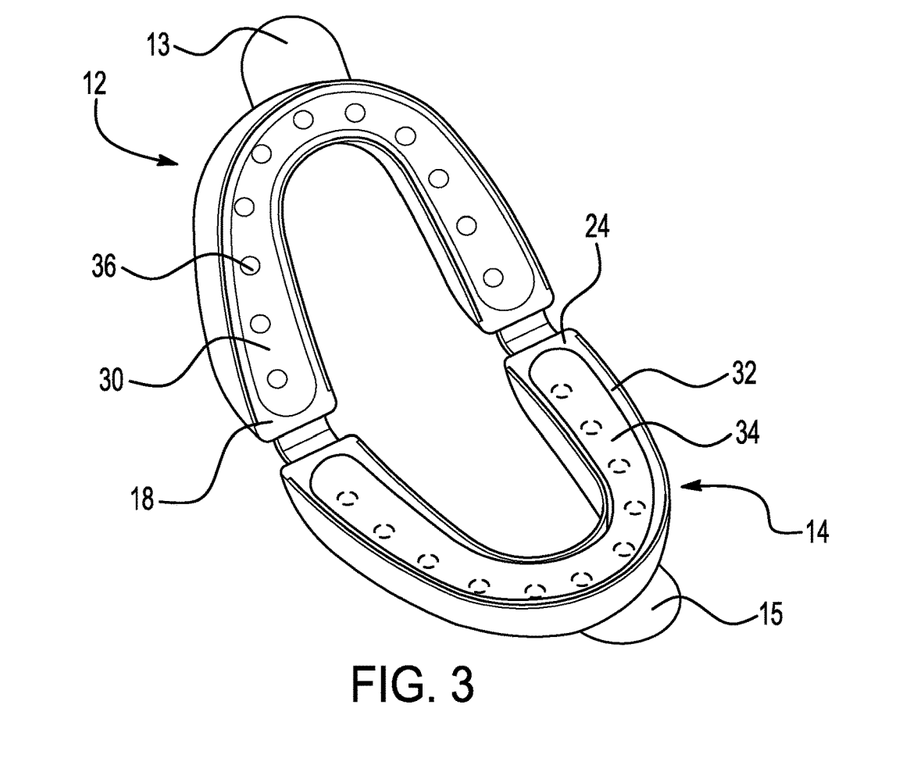
FIG. 3 is a perspective view of another dental treatment tray in an open configuration.
Figure 4:
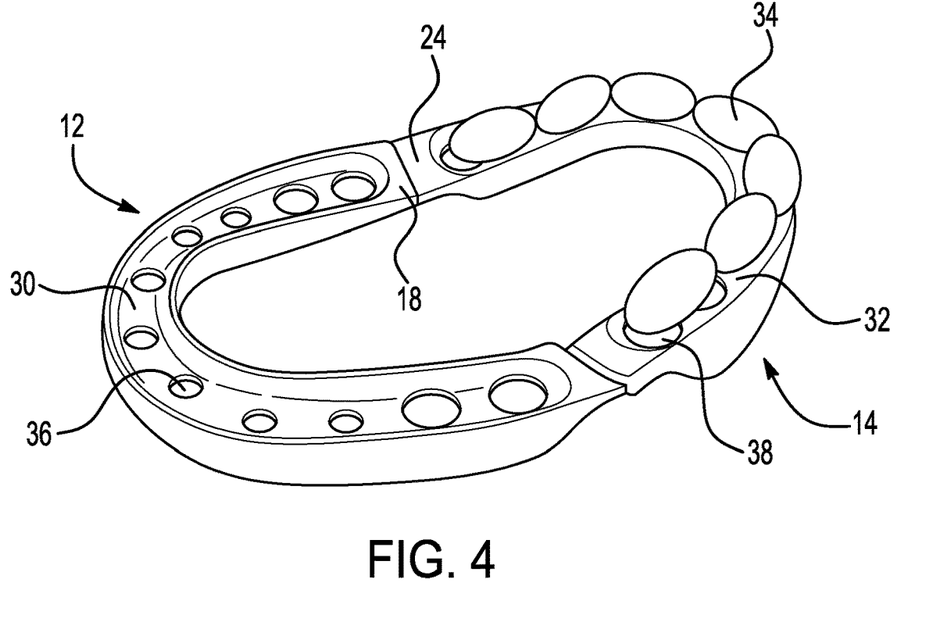
FIG. 4 is a perspective view of another dental treatment tray in an open configuration.

The base surface 18 of the top tray 12 includes at least one hole 36 extending through the base surface 18 and the base surface 24 of the bottom tray 14 also includes at least one hole 38 extending through the base surface 24. The at least one hole 36 in the base surface 18 and the at least one hole 38 of the base surface 24 may be formed, for example, in the areas of the depressions 30, 32, respectively, on the base surfaces 18, 24. The at least one hole 36, 38 is therefore configured to permit air and fluid passage between the at least one chamber 16 and an outside of the top tray 12 and the bottom tray 14, respectively. As depicted in FIGS. 1, 2A and 2B, for example, the at least one hole 36, 38 may be elongated in shape, extending at least a portion of the length of the respective base surface 18, 24. Additionally or alternatively, the at least one hole 36, 38 may be circular in shape, as depicted in FIGS. 3 and 4. The at least one hole 36, 38 may include more than one hole 36, 38 which may all be of the same shape and size, as depicted in FIGS. 1, 2A, 2B and 3, or alternatively may have different shapes and sizes, as depicted in FIG. 4. For example, at least one of the more than one hole 36, 38 through the base surface 18, 24 arranged toward the front of the user's mouth may be a different size than at least one of the more than one hole 36, 38 arranged toward the back of the user's mouth. In this manner, a dosage or amount of the dental treatment passing through the respective holes 36, 38 and being applied to the user's teeth and gums in the front of the user's mouth versus the back of the user's mouth may be controlled. It is understood that the various shapes, sizes, arrangements and numbers of the at least one hole 36, 38 described and depicted herein are provided as non-limiting examples, and that other suitable shapes, sizes, arrangements and numbers of at least one hole 36, 38 may be applicable to the dental treatment tray 10 described herein.

The at least one chamber 16 may include a plurality of discrete chambers 16 or may be a single elongated chamber 16 extending along at least a portion of the length of the base surfaces 18, 24, as depicted in the figures. The at least one capsule 34 contained within the at least one chamber 16 may include a plurality of discrete capsules 34. Each capsule 34 in the plurality of discrete capsules 34 may be contained within a respective one of the plurality of discrete chambers 16. Alternatively, a single chamber 16, or at least one of the plurality of discrete chambers 16, may contain more than one discrete capsule 34, as depicted in FIGS. 1, 2A, 2B and 4. Alternatively, as depicted in FIG. 3, the single elongated chamber 16 may contain a single capsule 34. The at least one capsule 34 may have a rounded elongated shape, as depicted in the figures, or may otherwise have a spherical shape or any other suitable shape that can be contained within the at least one chamber 16. The size of the at least one capsule 34 will be such that the at least one capsule 34 can be fully contained within the at least one chamber 16 formed between the base surfaces 18, 24. It is understood that the shapes, sizes, and arrangements of capsules 34 and chambers 16 described and depicted herein are provided as non-limiting examples, and that other suitable shapes, sizes, and arrangements of capsules 34 and chambers 16 may be applicable to the dental treatment tray 10 described herein.

Figure 5:
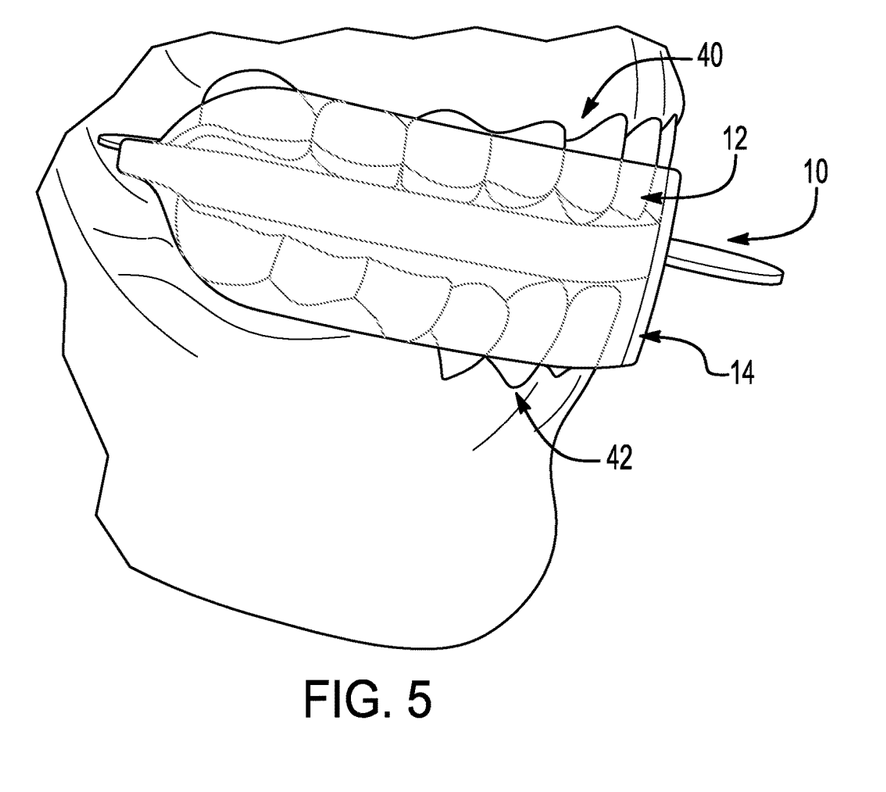
FIG. 5 is a perspective view of a dental treatment tray placed in a user's mouth.
Figure 6A:
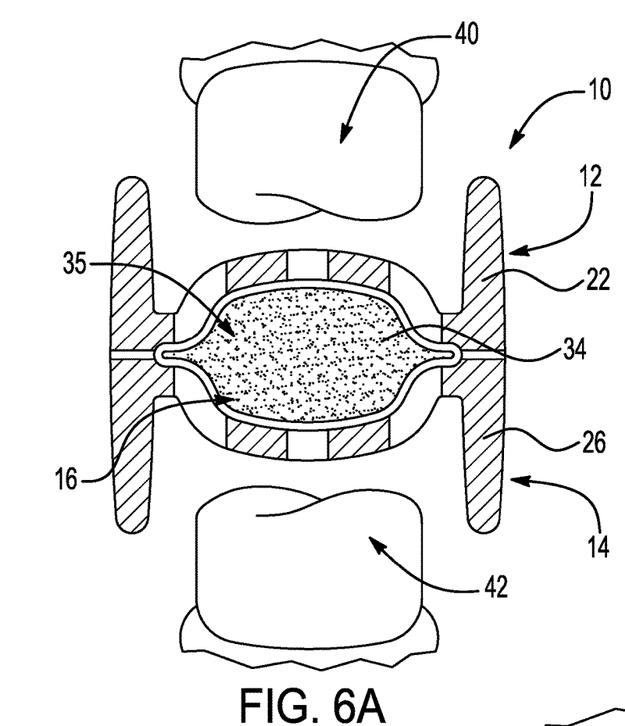
FIG. 6A is a cross-sectional view of a dental treatment tray placed in a user's mouth before a biting force is applied to the dental treatment tray.
Figure 6B:
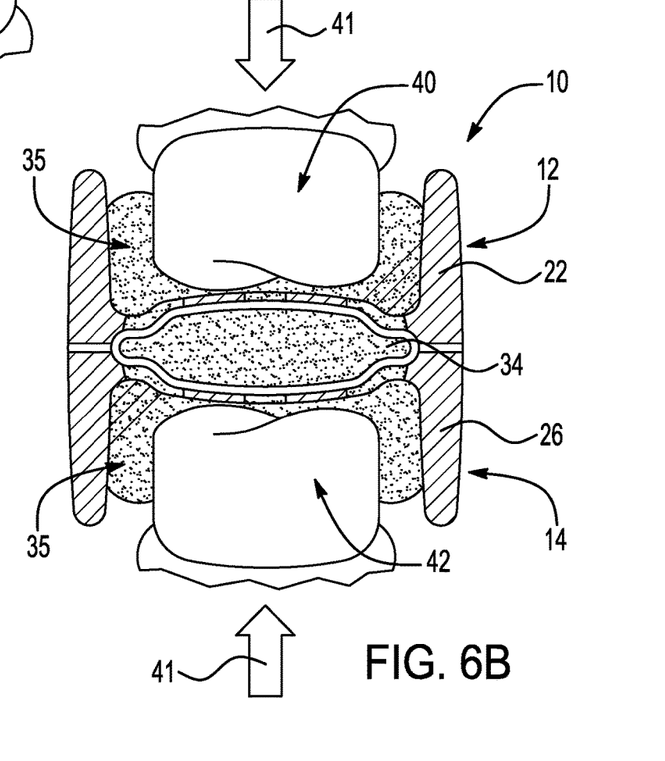
FIG. 6B is a cross-sectional view of the dental treatment tray of FIG. 6A, placed in the user's mouth after the biting force is applied to the dental treatment tray.

The at least one capsule 34 is configured to release the dental treatment encapsulated therein when, for example, a biting force is applied to the base surfaces 18, 24 of the top tray 12 and the bottom tray 14, respectively, and therefore to the at least one capsule 34 contained within the at least one chamber 16 therebetween. For example, with reference to FIG. 5, to use the dental treatment tray 10 and apply the dental treatment to the teeth 40, 42 and gums of the user, the dental treatment tray 10 is inserted into a user's mouth between the user's top teeth 40 and bottom teeth 42. The top tray 12 is therefore configured to be aligned with the user's top teeth 40, with the sidewalls 20 of the top tray 12 framing the front and back of the user's top teeth 40. The bottom tray 14 is configured to be aligned with the user's bottom teeth 42, with the sidewalls 26 framing the front and back of the user's bottom teeth 42. With reference to FIG. 6A, before any biting force is applied to the dental treatment tray 10, the at least one capsule 34 is contained within the at least one chamber 16, and the dental treatment 35 is fully encapsulated in the at least one capsule 34 contained within the at least one chamber 16 of the dental treatment tray 10. As depicted in FIG. 6B, when the user applies a biting force to the base surfaces 18, 24 of the dental treatment tray 10 (i.e., when the user brings the user's top teeth 40 and bottom teeth 42 together in the direction of arrows 41 to bite the base surfaces 18, 24), the biting force breaks an outer shell of the at least one capsule 34. In another embodiment, the shell of the at least one capsule 34 may simply dissolve when placed in the user's mouth and subject to the user's saliva, thereby releasing the dental treatment 35 therefrom. In either embodiment, the at least one capsule 34 releases the dental treatment 35 previously encapsulated within the outer shell of the at least one capsule 34 and the dental treatment 35 passes through the at least one hole 36 of the top tray 12 and the at least one hole 38 of the bottom tray 14, exiting the at least one chamber 16 and reaching the user's top teeth 40 and bottom teeth 42. The sidewalls 20 (on the top tray 12) and the sidewalls 26 (on the bottom tray 14) are configured to contain the dental treatment within the top tray 12 and the bottom tray 14, respectively, as the dental treatment surrounds the user's top teeth 40 and bottom teeth 42. As described earlier, the sidewalls 20, 26 may have a height sufficient to permit the dental treatment to reach the user's top gum line and bottom gum line, respectively.

Figure 7:
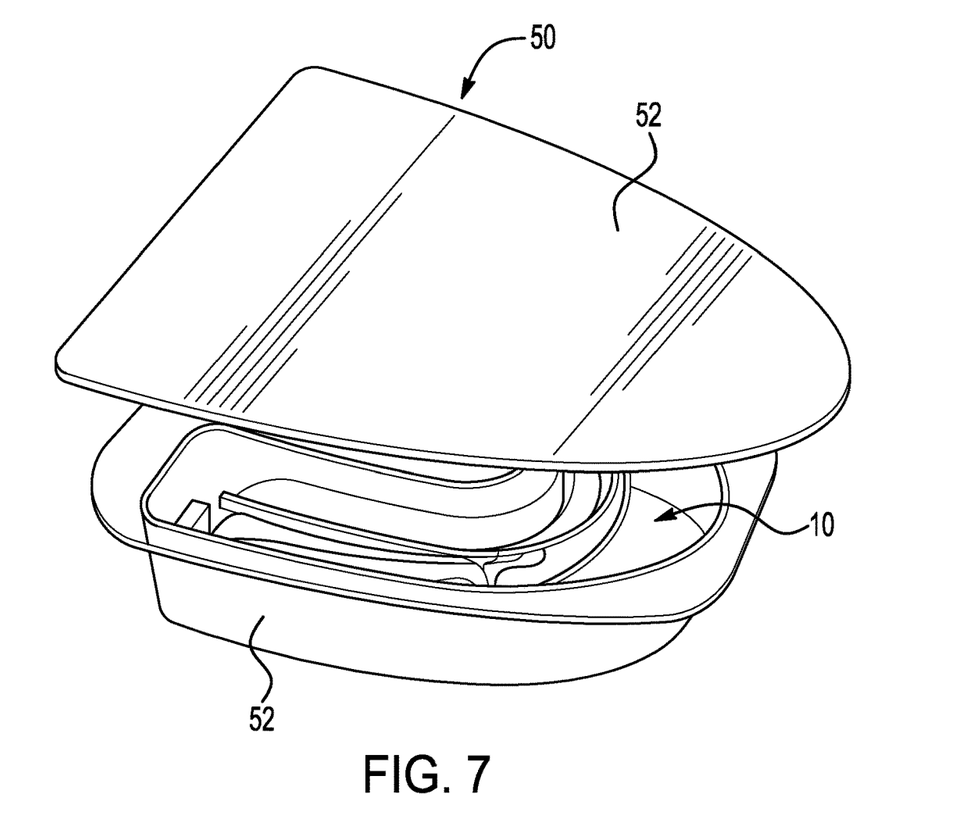
FIG. 7 is a perspective view of a packaging for a dental treatment tray.

The dental treatment tray 10, including the top tray 12 and the bottom tray 14, may be made of a thin, soft, and flexible material. For example, the material of the dental treatment tray 10 may be selected from at least one of a silicone, thermoplastic polyurethanes (TPU), thermoplastic elastomers (TPE), olefins, polypropylene, polyethylene, or any other suitable material. It is understood that the materials listed herein for the dental treatment tray 10 are provided as non-limiting examples and that other suitable materials may be applicable for the dental treatment tray 10 described herein. With reference to FIG. 7, the dental treatment tray 10 may be packaged in a sealed packaging 50 that is configured to block air permeability. For example, the packaging 50 may include a package tray 52 having a film 54 sealed on top of the package tray 52. For example, the package tray 52 may be foil sealed with a foil film 52. In another embodiment, the dental treatment tray 10 may be sealed within a heat-sealed bag or other package.

Figure 8:
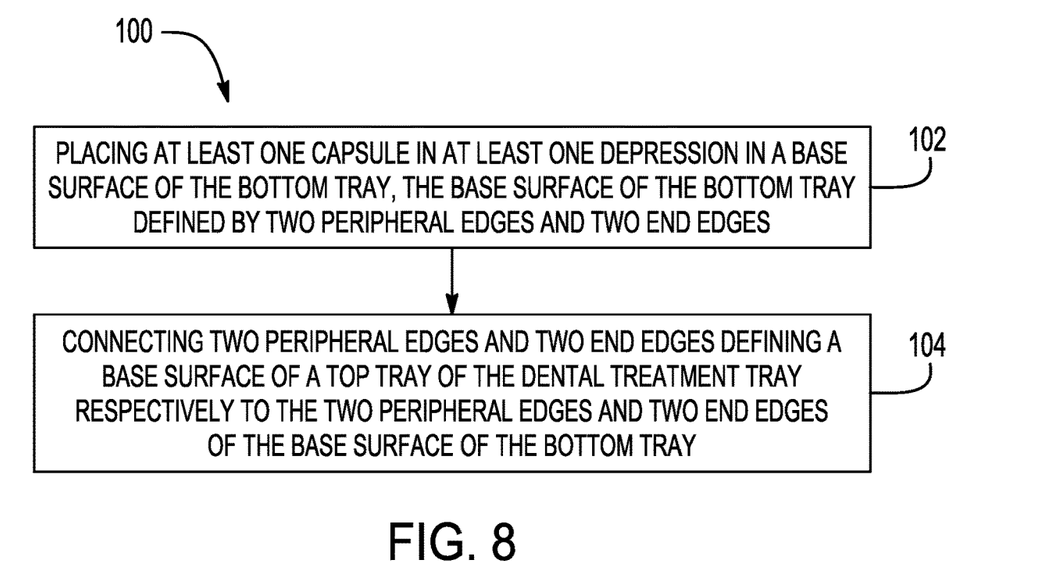
FIG. 8 is a flowchart of a method of applying a dental treatment tray to a user's teeth and gums using a dental treatment tray.

With reference to FIG. 8, a method 100 of assembling a dental treatment tray for applying a dental treatment to teeth and/or gums of a user is depicted. The dental treatment tray assembled by the method 100 may be the same as the dental treatment tray 10 described herein. Therefore, the method 100 includes the step 102 of placing at least one capsule in at least one depression in a base surface of a bottom tray of the dental treatment tray. The base surface of the bottom tray is defined by two peripheral edges and two end edges. The method 100 then includes a step 104 of connecting two peripheral edges and two end edges defining a base surface of a top tray of the dental treatment tray respectively to the two peripheral edges and two end edges of the base surface of the bottom tray. The base surface of the top tray also includes at least one depression that corresponds to the at least one depression of the base surface of the bottom tray, such that at least one chamber is formed between the base surface of the top tray and the base surface of the bottom tray, within which the at least one capsule is contained. The step 104 of connecting may include, for example, connecting via a tongue-and-groove connection between the two peripheral edges and/or the two end edges of the base surface of the top tray and the two peripheral edges and/or the two end edges of the base surface of the bottom tray, respectively. Alternatively, the step 104 of connecting may include welding the two peripheral edges and/or the two end edges of the base surface of the top tray to the two peripheral edges and/or the two end edges of the base surface of the bottom tray, respectively. In one embodiment, the step 104 of connecting may include providing a foldable hinge between each of the two end edges of the base surface of the top tray and the two end edges of the base surface of the bottom tray, such that the top tray is folded over on top of the bottom tray.

Although the above disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature may have been described above with respect to only one or more of several illustrated embodiments, such feature may be combined with one or more other features of the other embodiments, as may be desired and advantageous for any given or particular application.

What is claimed is:

1. A dental treatment device for applying a dental treatment to teeth and gums of a user, the dental treatment device comprising:
at least one dental treatment capsule encapsulating the dental treatment;
a dental treatment tray comprising:
a top tray including a base surface defined by two peripheral edges and two end edges, the base surface of the top tray having at least one hole extending therethrough;
a bottom tray including a base surface defined by two peripheral edges and two end edges, the base surface of the bottom tray having at least one hole extending therethrough;
wherein the top tray and the bottom tray are movable relative to each other between an open configuration and a closed configuration of the dental treatment tray;
wherein in the open configuration, the two end edges of the base surface of the top tray are hingedly connected to the two end edges of the base surface of the bottom tray, and the two peripheral edges of the base surface of the top tray are unconnected to the two peripheral edges of the base surface of the bottom tray;
wherein in the closed configuration, the two end edges of the base surface of the top tray are hingedly connected to the two end edges of the base surface of the bottom tray, and the two peripheral edges of the base surface of the top tray are connected to the two peripheral edges of the base surface of the bottom tray to form at least one chamber between the base surface of the top tray and the base surface of the bottom tray in which the at least one dental treatment capsule encapsulating the dental treatment is contained;
wherein the at least one hole of the top tray and the at least one hole of the bottom tray are configured to permit passage of the dental treatment from the at least one chamber to the teeth and gums of the user when the dental treatment tray is in the closed configuration.

2. The dental treatment device according to claim 1, wherein the at least one dental treatment capsule includes a shell.

3. The dental treatment device according to claim 2, wherein the shell of the at least one dental treatment capsule is configured to break when a biting force is applied to the base surface of the top tray and the base surface of the bottom tray by the teeth and gums of the user, thereby releasing the dental treatment.

4. The dental treatment device according to claim 2, wherein the at least one hole of the top tray and the at least one hole of the bottom tray are configured to prevent passage of the shell of the at least one dental treatment capsule from the chamber.

5. The dental treatment device according to claim 2, wherein the shell of the at least one dental treatment capsule is configured to dissolve when the dental treatment tray is in the mouth of the user, thereby releasing the dental treatment.

6. The dental treatment device according to claim 1, wherein the top tray further includes two sidewalls each extending from the base surface of the top tray along at least a portion of the respective peripheral edges of the base surface of the top tray.

7. The dental treatment device according to claim 1, wherein the bottom tray further includes two sidewalls each extending from the base surface of the bottom tray along at least a portion of the respective peripheral edges of the base surface of the bottom tray.

8. The dental treatment device according to claim 1, wherein at least one of the at least one hole of the top tray and the at least one hole of the bottom tray are elongated in shape.

9. The dental treatment device according to claim 1, wherein at least one of the at least one hole of the top tray and the at least one hole of the bottom tray are circular in shape.

10. The dental treatment device according to claim 1, wherein the at least one hole of the top tray includes more than one hole and the at least one hole of the bottom tray includes more than one hole.

11. The dental treatment device according to claim 10, wherein each of the more than one hole of the top tray and each of the more than one hole of the bottom tray, respectively, have the same size.

12. The dental treatment device according to claim 10, wherein at least two of the more than one hole of the top tray and at least two of the more than one hole of the bottom tray, respectively, have different sizes.

13. The dental treatment device according to claim 1, wherein the at least one capsule is elongated or spherical.

14. The dental treatment device according to claim 1, wherein the at least one capsule includes more than one capsule.

15. The dental treatment device according to claim 14, wherein each of the more than one capsule is the same size.

16. The dental treatment device according to claim 14, wherein at least two of the more than one capsule have different sizes.

17. The dental treatment device according to claim 1, wherein the top tray includes at least one top pull tab extending from the top tray.

18. The dental treatment device according to claim 1, wherein the bottom tray includes at least one bottom pull tab extending from the bottom tray.

19. A method of assembling a dental treatment tray for applying a dental treatment to teeth and gums of a user, the method comprising the steps of:
placing at least one capsule in at least one depression in a base surface of a bottom tray of the dental treatment tray, the base surface of the bottom tray defined by two peripheral edges and two end edges, the two end edges of the base surface of the bottom tray being hingedly connected to two end edges of a base surface of a top tray of the dental treatment tray; and
folding the base surface of the top tray over the base surface of the bottom tray and connecting the two peripheral edges of the base surface of the top tray of the dental treatment tray respectively to the two peripheral edges and two end edges of the base surface of the bottom tray of the dental treatment tray, wherein the base surface of the top tray includes at least one depression that corresponds to the at least one depression of the base surface of the bottom tray such that at least one chamber is formed by the base surface of the top tray and the base surface of the bottom tray within which the at least one capsule is contained.

* * * * *